INVENTOR
CHARLES R. BRUCE

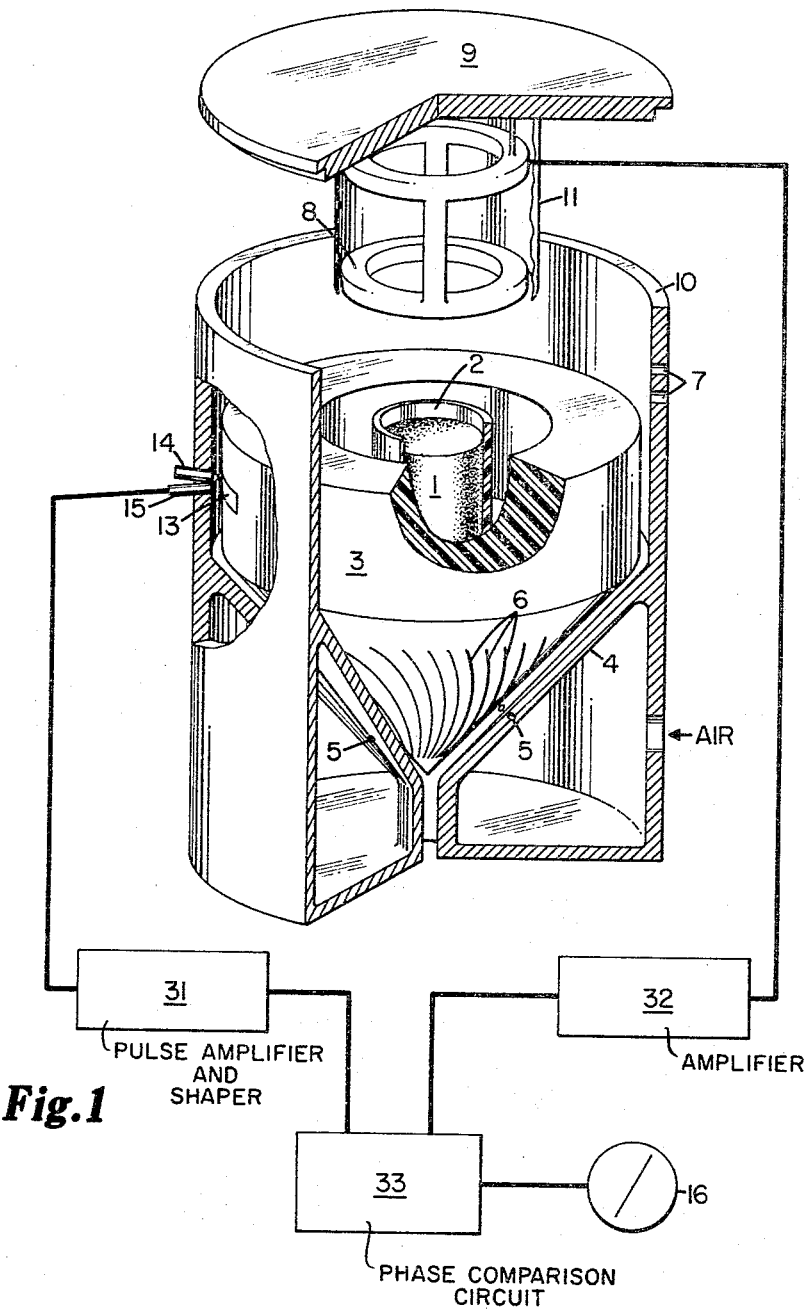

United States Patent Office 3,324,386
Patented June 6, 1967

3,324,386
FLUID OPERATED SPINNER MAGNETOMETER FOR DETERMINING THE ORIENTATION OF THE PRINCIPAL MAGNETIC AXIS OF A SAMPLE MATERIAL
Charles R. Bruce, Littleton, Colo., assignor to Marathon Oil Company, Findlay, Ohio, a corporation of Ohio
Filed Mar. 8, 1965, Ser. No. 437,796
11 Claims. (Cl. 324—14)

The present invention relates to the devices for the determination of the orientation of the principal magnetic axis of magnetized objects, and in particular, relates to new magnetometers of the spinning type.

Spin-type magnetometers have been employed for some years and an early variation is described in U.S. 1,459,970 to Burrows. The coils may be spun as in FIGURE 1 of the above Burrows patent, or the sample may be spun as in U.S. 2,105,650 to Hering et al., or U.S. 2,260,562 to Dillon. The interaction between sample and coils may be measured by determining deflection mechanically as in the above Burrows patent or in U.S. 2,104,752 to Lynton et al., or may alternatively be determined by measuring the current generated when a sample is spun in relation to a coil and then comparing the phase relationship between that current and a second signal generated by the driving mechanism as in the above Dillon patent. The drive means may be electrified as in all of the above patents, or may be a fluid operated turbine or other means.

One of the principal problems involved in such apparatus is the need for reducing the amount of "noise" caused by stray electromagnetic signals which interfere with electronic methods for the determination of phase separation between a reference signal and the current induced in a surrounding coil by a sample spinning in relation to the coil. Also, while the use of fluid operated turbines without mechanical bearings permits the spinning of the sample at high speeds, e.g., of the order of magnitude of 10,000 r.p.m., there is a need for a relatively high moment of inertia in such bearingless sample carriers to provide sufficient dynamic stability, especially when loaded with samples in which the principal axes of inertia do not coincide with the axes of rotation. Previously, attempts to produce sample carriers having high moments of inertia have required the enlargement of the surrounding coil in order that the sample carrier may be accommodated within the coil. Enlargement of the coil also increases the cross sectional area exposed to stray electromagnetic currents, and therefore, undesirably increases the noise level in such magnetometers. In addition, increasing the size of the coil reduces the "coupling" between the spinning sample and the coil. That is, the current generated in the coil for a given sample size and r.p.m. is undesirably lessened by enlargement of the coil size.

The present invention, by the use of configurations not previously utilized, provides magnetometers having high moment of inertia sample carriers which are dynamically stable, together with desirably low cross sectional area enclosed by the coil, and also combines the advantage of a high coupling between the coil and the spinning sample. In addition, in preferred embodiments, the present invention permits the manufacture of truly practical portable magnetometers which may be operated even under relatively severe ambient conditions without the need for separate external electromagnetic shielding.

FIGURE 1 illustrates a preferred embodiment of the present invention.

Figure 3:
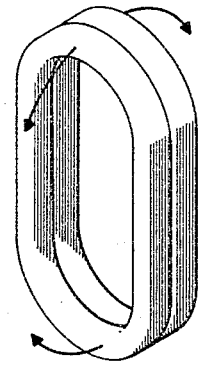
FIGURES 2 and 3 illustrate the preferred coil used in devices of the present invention.

In FIGURE 1, a cylindrical geological sample 1 approximately 1 inch in diameter by 1 inch long, obtained by dressing a drill core, is inserted into a close-fitting sample holder 2. The sample holder 2 is integrally attached and concentric with a rotor 3 with relatively large inertia. This rotor rests in a hollow stator block 4 which is fitted with gas inlets 5 which feed gas to several jets in the conical wall of the stator block. The gas jets strike a series of vanes 6 causing the rotor to rotate at speeds of from 6,000 to about 18,000 r.p.m. when gas, preferably air, at about 15 to 90 p.s.i.g. is fed into inlet 5. Gas flowing between the rotor 3 and the stator block 4 forms a "gas-bearing" permitting high speed rotation of the rotor with minimum frictional losses. The gas escapes from the apparatus through vent holes 7.

The sample holder and rotor are made of Bakelite but can be of any strong magnetically clean material. The moment of inertia ratio of holder plus rotor (herein called sample carriage) to sample is about 300 to 1 in this preferred embodiment. This ratio should be as high as possible but preferably will be above about 100 to 1.

Figure 2:
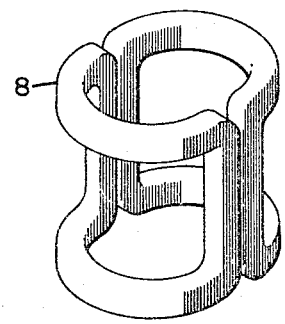

A coil 8 slides over the sample carrier 2 so as to encircle it closely. This coil is preferably of a design similar to that shown in FIGURE 2 in which the coil conforms to a cylinder. The two circular ends of coil are interconnected by vertical portions of the windings. This preferred type of coil is readily fabricated by first winding a planar coil and then bending out one-half of both the upper and lower portions toward each side of the coil as shown in FIGURE 3. The two vertical sections of the coil should preferably be centered along and in a plane with the major axis of the sample when the coil is in place. The coil is made of Number 36 to about Number 40 copper wire insulated with Formvar or other insulation. Approximately 1,000 to 4,000 turns of wire are preferred in order to get satisfactory current generation in the coil without increasing the bulk of the coil excessively. The ratio of the average radius of the coil to the outer radius of the sample will preferably be less than 5 to 1, more preferably less than 2 to 1, and most preferably as low as possible.

The coil 8 is positioned by a coil support 9 which preferably forms a flat circular lid which rests on projecting vertical side walls integral with the stator block 4.

Figure 4:
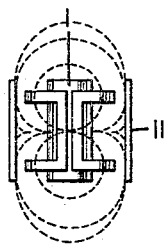
FIGURE 4 illustrates the path of the magnetic lines of force from the sample through the preferred magnetic shielding.

Closely encircling the coil 8 is a hollow cylindrical magnetic shield 11. This shield is preferably constructed of frenetic shield or co-netic shield manufactured by Perfection Mica Co., Chicago, Ill., or similar magnetic shielding material. As shown in FIGURE 4, this magnetic shielding not only serves to shield against stray electromagnetic radiation, but also, because the lines of force tend to concentrate in the shielding which is closely concentric with the coil, the magnetic flux through the coil is increased providing desirably increased coupling between the coil and the specimen. A ratio of average coil radius to average magnetic shielding radius of less than about 2 to 1 is preferred, and less than about 1.25 to 1 is still more preferred.

The coil holder 9 rotates freely in relation to the upper edge of the stator block 10 and hence in relation to the reference sensors permitting the coil to be turned until the current generated in the coil and an electronic signal generated by the rotation of the rotor 3 have any desired phase relationship.

The preferred electronic system for the present invention consists of circuitry for providing a reference signal generated by the rotation of the rotor 3, together with circuitry for determining when the reference signal and the current generated within coil 8 by the rotation of the specimen 1 have a desired phase relationship.

While the reference signal may be generated in a variety of ways, the preferred method is that illustrated in FIGURE 1. A light reflecting spot 13 is painted on or embedded into the rotor 3. The spot reflects illumination from a light source 14 into a photosensor 15, generating a pulse each time the spot passes the light-photosensor system. These pulses are amplified and shaped in a conventional electronic system 31 shown in FIGURE 1, and are then fed to a phase comparison circuit 33. The voltage induced in the coil is similarly conventionally amplified by amplifier 32 shown in FIGURE 1 and fed to the phase comparison circuit 33.

Preferably some method for measuring speed is provided to permit constant speed during tests, and minimize errors due to variations in phase shifts in the amplifiers.

Figure 5:
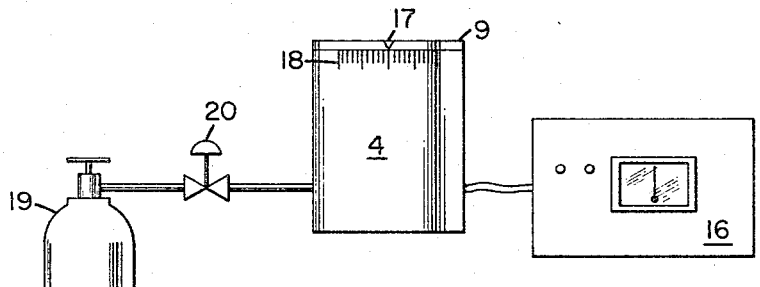
FIGURE 5 is an exterior view of the apparatus with its appurtenances.

FIGURE 5 shows the exterior of the assembled apparatus. In operation, the sample is spun under the influence of compressed gas from a cylinder 19 or compressor, flowing into the apparatus through a pressure control valve 20. The sample carrier-lid 9 is rotated until the phase comparison meter 16 reaches the "null" point indicating that the magnetic signal from the coil 8 lags by 90° the reference signal from the photosensor 15. The magnetic direction in the sample is then read directly from a degree scale 18 scribed on the exterior of the stator block 4, the reading being obtained opposite the indicator point 17 scribed on the coil holder 9.

Figure 6:
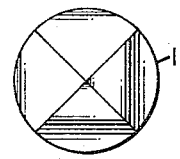
FIGURE 6 illustrates a preferred sample shape for use for the present invention.

In certain instances, when the total vector of magnetization must be found, it will be desirable to determine the magnetic orientation along a number of axes of the sample. This may readily be accomplished without modification of the apparatus by cutting the sample as shown in FIGURE 6 so as to permit it to be inserted in the sample holder in a number of orientations. The sample in FIGURE 6 is so cut as to present a circular cross section along each of three intersecting planes, each perpendicular to the other. Component readings, made as described above along each of the sample axes, may be utilized to calculate conventionally the magnetic orientation of the sample in 3 dimensions.

In most cases, the sample will be marked with an arbitrary orientation mark and the direction of the magnetization measured with respect to that mark. Knowing the direction of magnetization of the formation, the specimen may then be oriented geographically. Calibration of the apparatus may be accomplished with a sample of known magnetic orientation.

*Example I*

In a typical operation of the preferred embodiment of the apparatus above, a 1-inch diameter sample of rock that has been cut as shown in FIGURE 6 is scribed with a reference mark and inserted into the sample holder with the reference mark at the index on the holder. The coil and coil holder are lowered into position. The sample is spun at 9,300 r.p.m. by regulating the air pressure to the turbine. The coil holder-lid is turned until the meter indicates a null reading and the direction of magnetization relative to the reference mark on the sample is indicated on the scale on the container. Then the reference signal is shifted 90° and the intensity of magnetization is read from the meter. The coil and coil holder are lifted off and the sample is positioned in the holder for a different axis of rotation. The entire measurement of magnetization along 3 axes takes approximately 10 minutes.

From the above description of preferred embodiments, it will be obvious to persons skilled in the art that a wide variety of variations may be utilized with the present invention, and all such variations and modifications are intended to be included within the spirit of the invention and within the claims appended hereto.

From the above description of preferred embodiments, it will be obvious to persons skilled in the art that a wide variety of variations may be utilized with the present invention, and all such variations and modifications are intended to be included within the spirit of the invention and within the claims appended hereto.

What is claimed is:
1. A magnetometer for determining the orientation of the principal magnetic axis of a solid sample having remanent magnetism by spinning said sample within an electrical coil and measuring the difference in phase between the signal thus induced in said coil and a signal having a frequency proportional to the speed of rotation of said sample comprising in combination (a) a sample carrier for spinning about its major concentric axis, said sample carrier having a holder for said sample which is symmetrical about the major concentric axis of said sample holder; (b) fluid-operated drive means for spinning said sample carrier under the force of a stream of flowing fluid; (c) an electrical coil closely encircling a major portion of said sample when said sample is in said sample holder, said coil having a substantial portion of its length lying in the plane of the major concentric axis of said sample, said coil being mechanically independent of said sample and said sample holder and being positioned in EMF generating relationship to said sample, a substantial portion of the mass of said sample carrier being located outside the space enclosed by said coil, and lying at a greater distance from said concentric axis than to the said coil; (d) means for generating an electrical signal indicative of the rotation of said sample; (e) means for measuring the difference in phase between said signal proportional to the speed of rotation of said sample and the signal induced in said coil, whereby a sample carrier having a high moment of inertia is combined with a cross sectional area enclosed by said coil which is only slightly larger than the cross sectional area of said sample, and with a close electromagnetic coupling relationship between said sample and sail coil so that an electromotive force is generated in said coil when said sample is spinning in said sample carrier.

2. The device of claim 1 wherein the moment of inertia of the sample carrier is more than 100 times the moment of inertia of the sample.

3. The device of claim 1 wherein the average radius of the coil is less than 5 times the outer radius of the sample.

4. The device of claim 1 wherein the coil is surrounded by a concentric magnetic shield having a radius of less than about twice the average radius of the coil.

5. The device of claim 4 wherein the coil consists essentially of two circles of winding transverse to and concentric with the axis of rotation of the sample, together with two substantially vertical portions of the winding interconnecting said circles.

6. The device of claim 1 in which the sample is so cut as to present a circular cross section along each of three intersecting planes each of which is perpendicular to the others.

7. The device of claim 1 wherein the sample is contained within a substantially cylindrical relatively thin walled holder upstanding from a surface of said sample carrier, and wherein said coil closely encircles said substantially cylindrical holder and wherein means is provided for rotating said coil concentrically with the axis about which said sample is spun and wherein means is provided for determining the phase angle of the electromotive force generated in said coil whereby the coil can be rotated slowly until said phase angle is at a predetermined value and the orientation of the principal magnetic axis of said sample can then be determined by comparing the orientation of said coil with an index point which is in fixed relationship to said sample.

8. The device of claim 7 wherein the sample is contained within a substantially cylindrical relatively thin walled holder which is upstanding from a surface of said sample carrier and which is substantially encircled by a portion of said sample carrier, said encircling portion of said sample carrier being spaced from said thin walled holder by an annular space sufficient to permit the insertion of said coil in close encircling relationship around said thin walled holder and within said encircling portion of said sample carrier.

9. The device of claim 8 wherein said coil is closely encircled by a relatively thin walled encircling magnetic shield of magnetic shielding material and wherein the annular space between said thin walled sample holder and said encircling portion of said sample carrier is sufficient to permit said coil and said magnetic shield to be placed in encircling relationship to said thin walled sample holder so that said thin walled sample holder, said coil and said magnetic shield are all substantially encircled by said encircling portion of said sample carrier.

10. The device of claim 9 wherein said coil and said magnetic shield are dependent from a flat substantially horizontal lid which rests on a cylindrical housing encircling said sample carrier and wherein said coil can be rotated about the spin axis of said sample by rotating said lid.

11. The device of claim 9 wherein said lid and said housing are so marked as to indicate the rotated orientation of said lid.

References Cited
UNITED STATES PATENTS

| | | | |
|---|---|---|---|
| 2,680,833 | 6/1954 | Rothacker | 324—14 |
| 2,864,995 | 12/1958 | Shoolery | 324—.5 |
| 2,960,649 | 11/1960 | Bloch | 324—.5 |
| 3,038,115 | 6/1962 | Mueller | 324—.5 |
| 3,091,732 | 5/1963 | Anderson et al. | 324—.5 |

RUDOLPH V. ROLINEC, *Primary Examiner.*

WALTER L. CARLSON, *Examiner.*

G. R. STRECKER, *Assistant Examiner.*